(12) United States Patent
Mussmann et al.

(10) Patent No.: US 6,524,992 B2
(45) Date of Patent: Feb. 25, 2003

(54) SINGLE LAYER HIGH PERFORMANCE CATALYST

(75) Inventors: Lothar Mussmann, Offenbach (DE); Dieter Lindner, Hanau (DE); Martin Votsmeier, Bruchköbel (DE); Egbert Lox, Hanau (DE); Thomas Kreuzer, Karben (DE)

(73) Assignee: DMC2 Degussa Metals Catalysts Cerdac AG, Frankfurt am Main (DE)

( * ) Notice: Subject to any disclaimer, the term of this patent is extended or adjusted under 35 U.S.C. 154(b) by 0 days.

(21) Appl. No.: 09/818,998

(22) Filed: Mar. 28, 2001

(65) Prior Publication Data

US 2001/0046941 A1 Nov. 29, 2001

(30) Foreign Application Priority Data

Mar. 28, 2000 (EP) .............................. 00106611

(51) Int. Cl.[7] .................... B01J 23/10; B01J 23/42; B01J 23/46; B01J 23/63
(52) U.S. Cl. ................ 502/304; 502/302; 502/303
(58) Field of Search ................ 502/304, 302, 502/303

(56) References Cited

U.S. PATENT DOCUMENTS

| 4,675,308 A | * | 6/1987 | Wan et al. | ............... 423/213.5 |
| 4,678,770 A | * | 7/1987 | Wan et al. | ............... 423/213.5 |
| 4,965,243 A | | 10/1990 | Yamada et al. | |
| 5,139,992 A | | 8/1992 | Tauster et al. | |
| 5,200,384 A | | 4/1993 | Funabiki et al. | |
| 5,212,142 A | * | 5/1993 | Dettling | ................... 423/213.5 |
| 5,254,519 A | | 10/1993 | Wan et al. | |
| 5,712,218 A | | 1/1998 | Chopin et al. | |
| 5,981,427 A | * | 11/1999 | Sung et al. | ................. 502/304 |
| 5,990,038 A | * | 11/1999 | Suga et al. | ................. 502/303 |
| 6,103,660 A | | 8/2000 | Yperen et al. | |
| 6,294,140 B1 | | 9/2001 | Mussmann et al. | |
| 6,348,430 B1 | | 2/2002 | Lindner et al. | |

FOREIGN PATENT DOCUMENTS

| EP | 1 046 423 A2 | 10/2000 |
| EP | 1 046 423 A3 | 2/2002 |
| JP | 11226404 | 8/1999 |

OTHER PUBLICATIONS

European Search Report, dated Jul. 24, 2001.

* cited by examiner

Primary Examiner—Elizabeth D. Wood
(74) Attorney, Agent, or Firm—Kalow & Springut LLP

(57) ABSTRACT

A single layer high performance catalyst containing on an inert carrier body a catalytic coating comprising platinum, rhodium and various oxide materials. The catalyst contains a catalytic coating having at least one first support material selected from the group having a first active alumina, a ceria rich ceria/zirconia mixed oxide and a zirconia component, said at least one first support material being catalyzed with a first part of the total platinum amount of the catalyst, and a second support material catalyzed with the second part of the total platinum amount and with rhodium said second support material being a second active alumina.

20 Claims, 3 Drawing Sheets

SINGLE LAYER HIGH PERFORMANCE CATALYST

INTRODUCTION AND BACKGROUND

The present invention relates to a single layer high performance three-way catalyst (TWC) containing a catalytic coating comprising platinum, rhodium and various oxide materials on an inert carrier body.

Three-way catalysts are used to convert the pollutants carbon monoxide (CO), hydrocarbons (HC) and nitrogen oxides ($NO_x$) contained in the exhaust gas of internal combustion engines into harmless substances. Known three-way catalysts with good activity and durability utilize one or more catalytic components from the platinum group metals such as platinum, palladium, rhodium deposited on a high surface area, refractory oxide support, e.g., a high surface area alumina. The support is usually carried in the form of a thin layer or coating on a suitable carrier or substrate such as a monolithic carrier comprising a refractory ceramic or metal honeycomb structure.

The ever increasing demand for improved catalyst activity and life has led to complex catalyst designs comprising multiple catalyst layers on carrier structures, each of the layers containing selected support materials and catalytic components as well as so called promoters, stabilizers and oxygen storage compounds.

For applying the different layers onto the carrier structures so-called coating dispersions, coating compositions or washcoat compositions are prepared which comprise the support materials in finely divided form and optionally additional soluble components. The liquid phase of the coating composition is preferably water. This coating composition is used to apply the catalytic coating onto the carrier structures. The techniques for applying the coating are well known to the expert. The fresh coating is then dried and calcined to fix the coating and to transform the optional soluble components of the coating composition into their final insoluble form.

For the production of double or multiple layer catalysts a dedicated coating composition for each layer has to be provided. This increases the production costs. Therefore, it is one object of the present invention to design a single layer catalyst which approximates the catalytic properties of sophisticated multiple layer catalysts.

Modern three-way catalysts make use of the platinum group metals platinum, palladium and rhodium. Platinum and palladium mainly promote the oxidation of hydrocarbons (HC) and carbon monoxide (CO) and may be present in the catalyst simultaneously or alternatively. Rhodium primarily promotes the reduction of nitrogen oxides ($NO_x$). While platinum and palladium may replace each other to a certain extent, this is not the case for rhodium. The exhaust gas cleaning efficiencies promulgated by the most recent legal exhaust gas standards can only be met at reasonable cost by using rhodium together with one or both of platinum and palladium.

On the other hand it was observed that rhodium containing three-way catalysts suffer under the so-called fuel-cut ageing. The term fuel-cut ageing describes catalyst performance degradation due to fuel-cut after high load operation of the internal combustion engine. Such a situation occurs frequently during fast driving phases when abrupt deceleration is required. During fast driving phases the engine is operated at air/fuel ratios slightly below the stoichiometric value. The exhaust gases may reach temperatures well above 900° C. resulting in even higher catalyst temperatures due to the exothermic conversion reactions at the catalyst. In case of abrupt deceleration modern motor electronics completely stop fuel supply to the engine with the result that the normalized air/fuel ratio (also called lambda value $\lambda$) of the exhaust gas jumps from rich to lean values.

These large excursions of the normalized air/fuel ratio from rich to lean values at high catalyst temperatures degrade catalytic activity. Catalytic activity can at least partly be recovered by prolonged operation under stoichiometric or rich exhaust gas conditions. The faster catalytic activity is regained after fuel-cut ageing the better is the overall catalyst performance. Speeding up recovery of catalytic activity after fuel-cut ageing is therefore mandatory for modern three-way catalysts.

Therefore, it is another object of the present invention to provide a catalyst with higher resistance towards fuel-cut ageing. That is, after high temperature ageing under lean exhaust gas conditions, the catalyst should recover its full three-way efficiency quickly. Reduced fuel-cut ageing will also improve the overall dynamic behaviour of the catalyst.

U.S. Pat. No. 4,965,243 discloses a single layer three-way catalyst comprising, on activated alumina, platinum and rhodium in a weight ratio of 5:1 and further cerium oxide, barium oxide and zirconium oxide. This combination of components is said to be very effective for maintaining an excellent catalyst activity even after the catalyst has been exposed to high temperatures of 900 to 1100° C.

U.S. Pat. No. 5,200,384 describes a single layer three-way catalyst comprising, on activated alumina, platinum and rhodium in a weight ratio of 5:1 and further cerium oxide an a coprecipitated ceria-stabilized zirconia having a weight ratio of ceria to zirconia between 1:99 and 25:75. The addition of the coprecipitated ceria-stabilized zirconia to the three-way catalyst is said to enhance the activity of the catalyst at low temperature after high temperature ageing.

U.S. Pat. No. 5,254,519 discloses a single layer catalyst comprising a combination of a coformed rare earth oxide-zirconia having a rhodium component dispersed thereon and a first activated alumina having a platinum component dispersed thereon. The catalyst may comprise a second rhodium component dispersed on the first alumina support. Alternatively, the second rhodium component may be dispersed on a second alumina component.

During the last years there could be observed a tendency of replacing platinum in three-way catalysts completely with palladium because of its lower price and good oxidation activity. Palladium/rhodium and platinum/palladium/rhodium three-way catalysts had been developed which exhibited excellent catalytic activities at high palladium loads. Meanwhile the high demand for palladium has created a world-wide palladium shortage associated with a large increase of palladium prices. Nowadays palladium is more expensive than platinum. Therefore it is still another object of the present invention to provide a catalyst using platinum and rhodium with less precious metal costs but equivalent catalytic activity compared to palladium and rhodium containing catalysts.

SUMMARY OF THE INVENTION

These and further objects of the invention can be achieved with a single layer high performance catalyst containing on an inert carrier body a catalytic coating comprising platinum, rhodium and various oxide materials.

The catalyst is characterized in that the catalytic coating comprises a) at least one first support material selected from the group consisting of a first active alumina, ceria rich ceria/zirconia mixed oxide and a zirconia component, said at least one first support material being catalyzed with a first part of the total platinum amount of the catalyst, and b) a second support material catalyzed with the second part of the total platinum amount and with rhodium said second support material being a second active alumina.

The term "a material is catalyzed with" means that said material holds on its surface catalytically active components in highly dispersed form, such as platinum, rhodium or palladium.

The present invention is based on a co-pending European patent application of the inventors with publication number EP 1 046 423 A2. This application discloses a double layer catalyst with an inner and an outer layer on an inert carrier body comprising noble metals from the platinum group deposited on support materials. In the inner layer platinum is deposited on a first support and on a first oxygen storage component and in the outer layer platinum and rhodium are deposited on a second support and the second layer further comprises a second oxygen storage component.

The catalyst of the co-pending European patent application exhibits excellent catalytic properties compared to state of the art palladium and rhodium containing three-way catalysts. The present invention tries to reach similar catalytic properties with a single layer catalyst design to cut down production costs.

With the catalyst of the present invention, reduced fuel-cut ageing and improved dynamic behaviour and catalytic activities are obtained by placement of platinum and rhodium on dedicated support materials. The superior catalytic activity of the catalyst allows to reduce the precious metal loading while still maintaining catalytic activity comparable to state of the art three-way palladium/rhodium catalysts. This leads to reduced precious metal costs compared to conventional catalysts.

It is an essential feature of the present invention that all of the rhodium present in the catalyst is closely associated with platinum. This is accomplished by depositing the second part of the total platinum amount and rhodium onto the same particulate support material, the second active alumina.

According to the present understanding of the invention the reason for the reduced sensitivity against fuel-cut ageing may be that large excursions of the normalized air/fuel ratio from rich to lean values at high catalyst temperatures degrades the catalytic activity especially of rhodium. Under stoichiometric or rich exhaust gas conditions rhodium is reduced nearly to the oxidation state zero which is the most effective state for three-way catalysis. Under lean exhaust gases and at high catalyst temperatures rhodium gets oxidized up to oxidation level +3. This oxidation state of rhodium is less active for three-way conversion of pollutants. Moreover, since $Rh_2O_3$ is isomorphic in crystallographic structure to $Al_2O_3$ it can migrate at temperatures above 600° C. into the lattice of alumina or other isomorphic support oxides of the general composition $M_2O_3$ (M stands for a metal atom), resulting in a permanent degradation of catalytic activity.

To regain its catalytic activity and to avoid losses of rhodium into the lattice of alumina rhodium must therefore be reduced as quickly as possible when the exhaust gas composition changes back to stoichiometry. According to the present understanding of the invention reduction of rhodium to oxidation state zero is catalyzed by platinum. The more intimate the contact between platinum and rhodium the better is this reduction effect.

In addition, the tendency of $Rh_2O_3$ to migrate into isomorphic support oxides can be limited by appropriate doping of these oxides. Beneficial are doping components which are capable of generating activated hydrogen under reducing conditions. The activated hydrogen helps to convert rhodium oxide more rapidly into the metallic form under reducing conditions and hence the risk of $Rh_2O_3$ migrating into the support oxide is further minimized. A suitable doping component for that purpose is cerium oxide (ceria). But since ceria also exhibits an oxygen storage and release capability the amount of doping with ceria must be kept low so as to not promote oxidation of rhodium by a too high level of ceria in the support oxide.

Further improvement of the ageing stability of the catalyst is achieved by proper selection of an oxygen storage component. Ceria is well-known to exhibit an oxygen storage capability. Under lean exhaust gas conditions cerium is completely oxidized to the oxidation state $Ce^{4+}$. Under rich exhaust gas conditions ceria releases oxygen and acquires the $Ce^{3+}$ oxidation state. Instead of using pure ceria as an oxygen storage compound the present invention uses ceria rich ceria/zirconia mixed oxide compounds. The term ceria rich denotes a material containing more than 50 wt.-% of ceria. Ceria concentrations of from 60 to 90 wt.-% relative to the total weight of the mixed oxide are preferred. Such materials are available with specific surface areas of 20 to 200 $m^2/g$ and exhibit a good temperature stability of the surface area. These materials are known to have a cubic crystalline habit of the type $CeO_2$ as disclosed in U.S. Pat. No. 5,712,218. Further improvements can be obtained by stabilizing this material with praseodymia, yttria, neodymia, lanthana, gadolinium oxide or mixtures thereof. Stabilizing of oxygen storage materials based on ceria using praseodymia, neodymia, lanthana or mixtures thereof is described in German patent application DE 197 14 707 A1. Stabilization of ceria/zirconia mixed oxide with praseodymia is much preferred.

As already explained, the second part of the total platinum amount of the catalyst is in close contact to rhodium. This helps to reduce rhodium oxide formed during fuel-cut-off phases back to low oxidation state. For performing this task mass ratios between platinum and rhodium of 1:1 are most effective. Nevertheless, deviations from the 1:1 ratio between 3:1 and 1:5 have proven to still give good catalytic activities. While this mass ratio is valid for platinum and rhodium deposited together on the second active alumina the overall platinum/rhodium mass ratio in the catalyst may vary between 10:1 and 1:5, preferably between 10:1 and 1:1 with 3:1 being most preferred.

The zirconia component of the first support materials may be zirconia, optionally stabilized with 0.5 to 10 wt.-% of yttria, ceria, neodymia, lanthana, praseodymia, gadolinium oxide or mixtures thereof. Alternatively, the zirconia component may be equipped with an oxygen storage function by adding ceria in an amount sufficient to provide a substantial proportion of the total oxygen storage capacity of the catalyst. The ceria content of this zirconia component may vary from above 1 to below 50 wt.-% relative to the total weight of the zirconia component. Such materials are commercially available as so-called zirconia/ceria mixed oxides. "Zirconia" in the first place of "zirconia/ceria" indicates that zirconia is present in an amount which is at least equivalent but in general larger than the amount of ceria. Such a zirconia component may further be stabilized with the stabilizers mentioned above, namely yttria, neodymia, lanthana, praseodymia, gadolinium oxide or mixtures thereof at the expense of zirconia and ceria. Thus, the overall composition of the zirconia component may comprise of from 99.5 down to 45 wt.-% of zirconia and of from 0.5 to 55 wt.-% of ceria, yttria, neodymia, lanthana, praseodymia, gadolinium oxide or mixtures thereof, whereby zirconia is present in an amount which is equal to or larger than the amount of ceria.

The first support materials form the major part of the catalytic coating. The weight range of the first support materials relative to the second support material ranges between 1.1:1 to 20:1. The concentration of the first part of the total platinum amount of the catalyst on the first support materials (selected from active alumina, ceria/zirconia mixed oxide and the zirconia component or mixtures thereof) ranges between 0.01 and 5, preferably between 0.05 and 1 wt.-%, relative to the total weight of the catalyzed materials. Contrary to that, the concentration of platinum plus rhodium on the second support material (second active alumina) is preferably higher and lies between 0.5 and 20 wt.-% relative to the weight of the second support material with concentrations between 1 and 15 wt.-% being preferred. In total, platinum and rhodium together are present in the catalytic coating in concentrations of from 0.02 to 10 wt.-% relative to the total weight of the coating.

The catalyst carrier body used in the present invention is in the form of a honeycomb monolith with a plurality of substantially parallel passage ways extending therethrough. The passage ways are defined by walls onto which the catalytic coating is applied.

The passage ways of the carrier body serve as flow conduits for the exhaust gas of the internal combustion engine. When flowing through these passages the exhaust gas comes into close contact with the catalytic coating whereby the pollutants contained in the exhaust gas are converted into benign products. The carrier bodies may be manufactured from any suitable material, such as from metallic or ceramic materials as is well known in the art. The passage ways are arranged in a regular pattern over the cross section of the carrier bodies. The so-called cell density (passage ways per cross sectional area) may vary between 10 and 200 $cm^{-2}$. Other suitable carrier bodies may have an open cell foam structure. Metallic or ceramic foams may be used.

The catalytic coating is applied to the carrier body in amounts of from about 50 to 250 g/l. Advantageously the catalytic coating comprises of from 0 to 150 g/l, preferably of from 20 to 150 g/l, of said first active alumina and of from 10 to 100 g/l, preferably of from 20 to 100 g/l, of said ceria/zirconia mixed oxide component. The zirconia component may be present in concentrations of from 0 to 80 g/l, preferably of from 5 to 60 g/l.

For proper functioning of the catalyst it requires a sufficient oxygen storage capacity. The oxygen storage capacity of the catalyst is primarily supplied by said ceria rich ceria/zirconia component. In minor amounts also the zirconia component may provide a certain portion to the overall oxygen storage capacity of the catalyst. But in a preferred embodiment of the catalyst the oxygen storage capacity of the catalyst is solely based on ceria rich ceria/zirconia mixed oxide while the zirconia component is a pure zirconia material or zirconia stabilized with 0.5 to 10 wt.-% of the stabilizers already mentioned above.

The concentration of said second active alumina is preferably selected between 5 and 50 g/l. In a most preferred embodiment the first and second active alumina are the same and have a specific surface area between 50 and 200 $m^2/g$ and are stabilized with 0.5 to 25 wt.-% of lanthana, ceria, yttria, neodymia, gadolinium oxide or mixtures thereof. The oxygen storage component is advantageously selected from ceria rich ceria/zirconia mixed oxides containing 60 to 90 wt.-% of ceria and additionally stabilised with 0.5 to 10 wt.-% of praseodymia ($Pr_6O_{11}$).

For the purpose of suppressing the emission of hydrogen sulphide the catalytic coating may further comprise from about 1 to 30 g/l of a nickel, iron or manganese component.

The surface area of the support materials for the noble metal components is important for the final catalytic activity of the catalyst. Generally the surface area of these materials should lie above 10 $m^2/g$. The surface area of these materials is also called specific surface area or BET surface area in the art. Preferably the surface area of the materials should be larger than 50 $m^2/g$, most preferably larger than 100 $m^2/g$. Active aluminas with a surface area of 140 $m^2/g$ are conventional. Oxygen storage components based on ceria or ceria/zirconia mixed oxides are available with surface areas of 80 $m^2/g$ up to 200 $m^2/g$, depending on the state of calcination upon delivery. Besides this, there are also available so-called low surface area ceria materials with surface areas below 10 $m^2/g$. Zirconia materials with 100 $m^2/g$ are also conventional.

BRIEF DESCRIPTION OF DRAWINGS

The invention is further explained with respect to FIGS. 1 to 3.

DETAILED DESCRIPTION OF INVENTION

Figure 1:
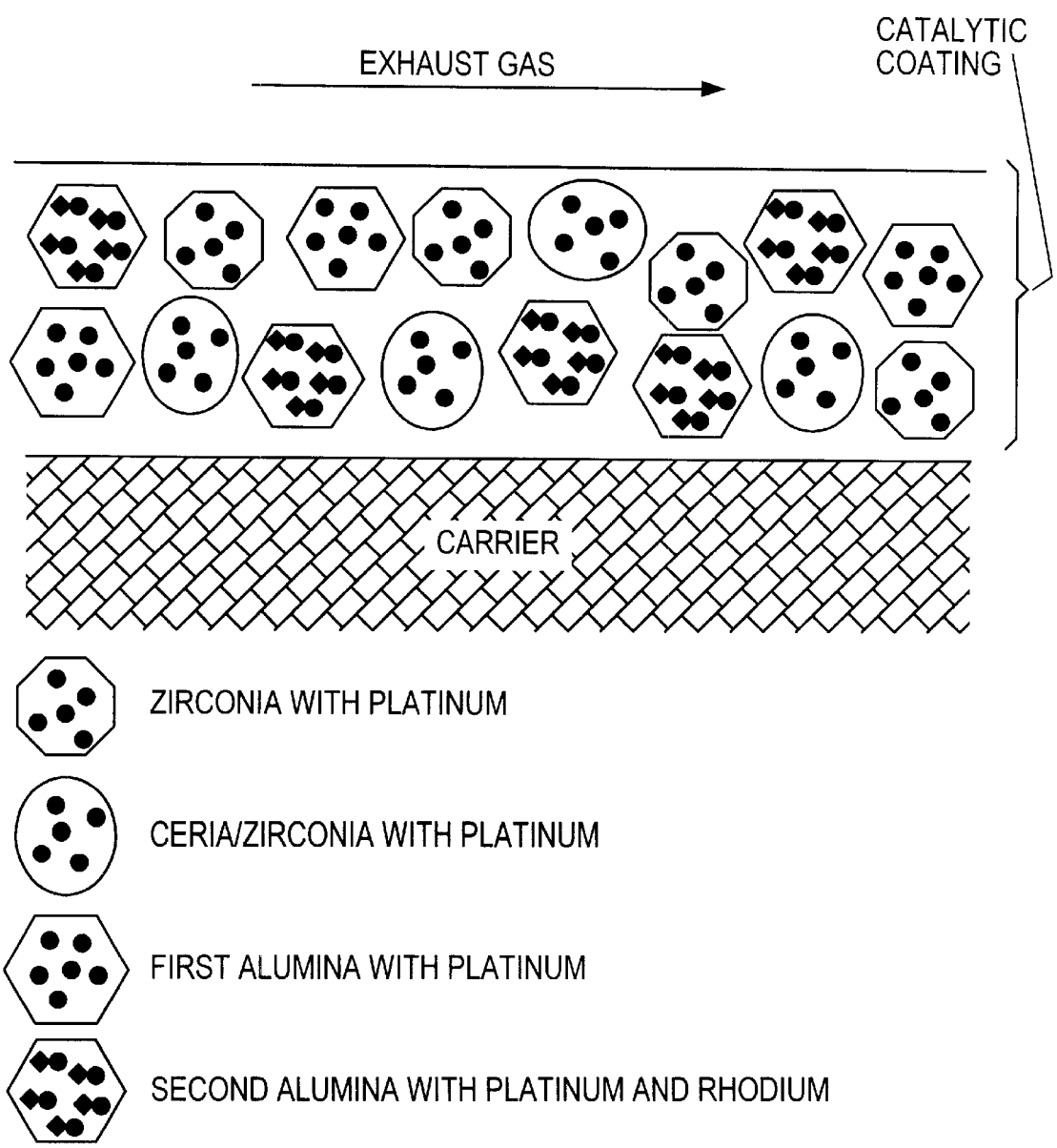
FIG. 1 is a schematic representation of the structure of an embodiment of the single layer catalyst comprising first and second alumina, ceria/zirconia and zirconia as support materials.

FIG. 1 shows a sectional view of a first embodiment of the catalytic coating, comprising both the first and second active alumina. The coating is deposited on an inert carrier. The different support materials of the catalyst are symbolized by different geometric bodies. Platinum only is deposited on the first alumina (represented by a hexagon), on ceria/zirconia (represented by an ellipse) and on zirconia (represented by an octagon). The platinum crystallites are symbolized by small circles. Platinum and rhodium are deposited on the second alumina. The rhodium crystallites are symbolized by small diamonds. In the present catalyst platinum and rhodium are in intimate contact with each other. In order to visualize this fact, platinum and rhodium crystallites are arranged in FIG. 1 in pairs. This arrangement in pairs is only for explanation purposes and is not intended to restrict the scope of the invention. The actual relationship between platinum and rhodium is dependent on the manufacturing process and may vary from isolated platinum and rhodium crystallites on the same alumina particle via closely neighboured platinum and rhodium crystallites to real platinum/rhodium alloys.

According to the present understanding of the invention it is expected that best results are achieved with closely neighboured platinum and rhodium crystallites and real platinum/rhodium alloys.

Figure 2:
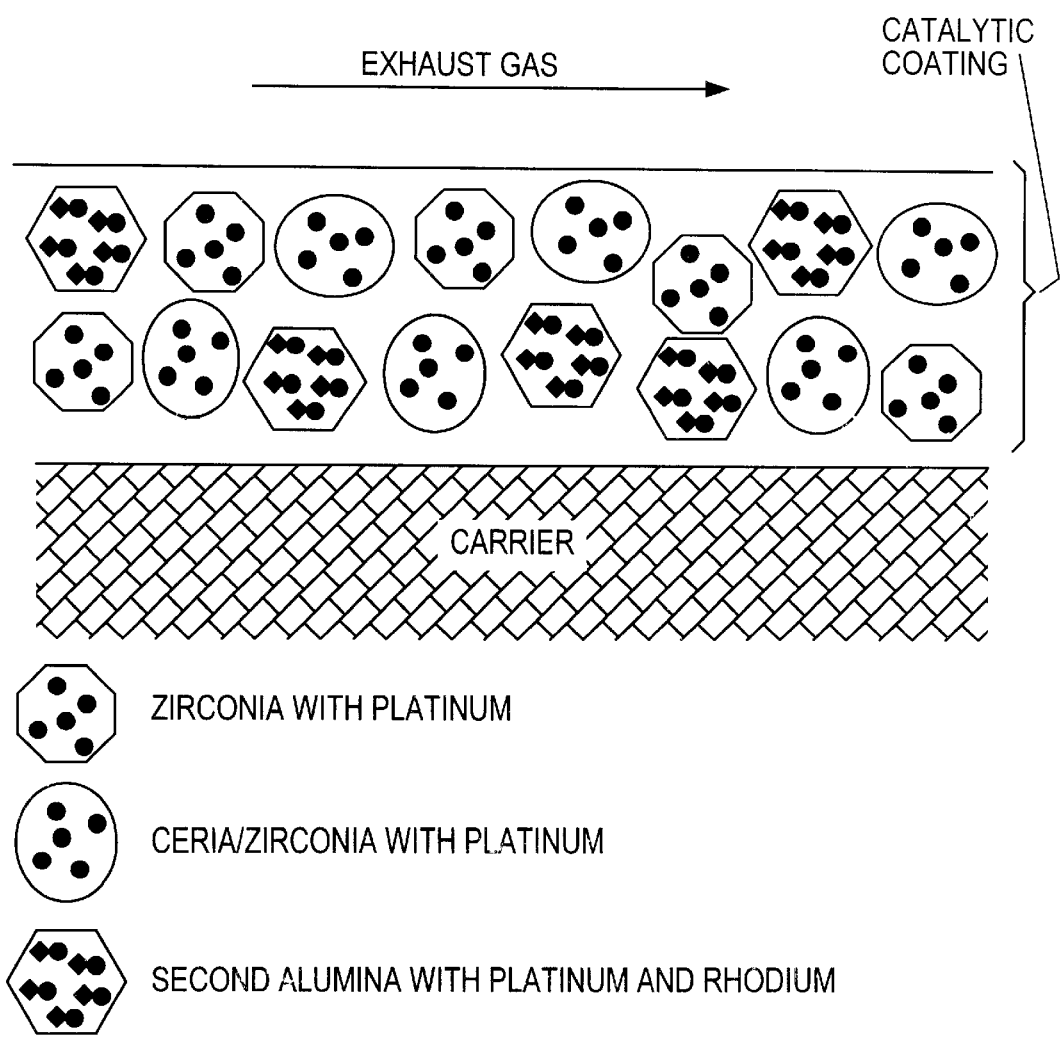
FIG. 2 is a schematic representation of the structure of a second embodiment of the single layer catalyst comprising only the second alumina, ceria/zirconia and zirconia as support materials.

While in FIG. 1 first and second alumina are employed as supports for platinum and platinum/rhodium, respectively, it should be understood that the first alumina supporting platinum is an optional component which may be omitted since platinum is also supported by ceria/zirconia and zirconia component. Such an embodiment of the inventive catalyst is shown in FIG. 2. In FIG. 2 the catalyst layer does not contain the first alumina component.

The catalyst of the present invention may be manufactured in various ways. Some of them will be described below:

For applying the catalytic coating to the passage ways of the catalyst carrier, the catalyst carrier can be coated with an aqueous coating composition comprising the specified catalyzed particulate support materials. The coating composition will also be called coating dispersion within the context of this invention. The techniques for coating catalyst carriers with such a coating composition are well known to the expert. The coating is then dried and calcined in air. Drying is preferably done at elevated temperatures of up to 150° C. For calcining the coating, temperatures of from 200 to 500° C. for a period from 0.5 to 5 hours should be used.

Before preparing the coating composition, the support materials have to be catalyzed with the respective noble metals. For catalyzing the support materials with platinum only, conventional techniques such as impregnation with a solution containing a precursor compound of platinum may be employed. Any platinum precursor compound may be used provided the compound is soluble in the chosen solvent and decomposes to the metal upon heating in air at elevated temperatures. Illustrative of these platinum compounds are chloroplatinic acid, ammonium chloroplatinate, platinum tetrachloride hydrate, platinum dichlorocarbonyl dichloride, dinitrodiamino platinum, platinum nitrate and amine solubilized platinum hydroxide. Precursor compounds with low or no chlorine content are preferred. Especially preferred are amine solubilized platinum compounds such as methylethanolamine platinum (IV) hexahydroxide $(MEA)_2Pt(OH)_6$ and ethanolamine platinum (IV) hexahydroxide $(EA)_2Pt(OH)_6$. These anionic complex compounds of platinum are known to yield platinum metal deposits of high dispersion. After impregnation the support materials are dried at elevated temperatures and calcined at temperatures between 200 and 500° C. in air to thermally fix platinum thereon. The thus catalyzed materials are then preferably dispersed in water to give a first dispersion.

In a preferred method for catalyzing the respective support materials with platinum they are impregnated by the so-called injection impregnation. The method of impregnation by injection is described in German patent applications DE 197 14 732 A1 and DE 197 14 707 A1. For that purpose the support materials are dispersed in water and then a solution of a basic precursor compound of platinum, preferably $(EA)_2Pt(OH)_6$, is injected slowly into the dispersion. Thereby the pH-value of the dispersion is raised into the basic region. Platinum is then precipitated onto the particulate materials by properly adjusting the pH-value of the dispersion with acetic acid. Precipitation starts when the pH-value of the dispersion starts to drop. Generally a pH-value below 7 is needed to complete precipitation. During injection and precipitation the dispersion is continuously agitated to rapidly distribute the injected solution homogeneously over the whole volume of the dispersion. This procedure ensures firm adhesion of the precipitated platinum compound on the support materials so that thermal fixation by drying and calcining as describe above is no longer necessary. The dispersion resulting from this procedure may directly be used as the first dispersion mentioned above.

Next, the second active alumina carrying platinum and rhodium is prepared by impregnating this support with an aqueous solution of soluble precursor compounds of platinum and rhodium and drying and calcining the impregnated support. Suitable precursor compounds for platinum are those already mentioned above. As precursor for rhodium hexaamminerhodium chloride, rhodium trichloride, rhodium carbonylchloride, rhodium trichloride hydrate, rhodium nitrate and rhodium acetate may be used advantageously, but rhodium nitrate being preferred.

The second active alumina may be impregnated with platinum and rhodium precursors sequentially in any order or simultaneously from one common solution. The thus catalyzed active alumina is dried and calcined to fix platinum and rhodium thereon.

Then this material is redispersed in water to give a second dispersion. First and second dispersions are then combined to yield the final coating composition.

However, as pointed out above, it is highly desirable to obtain a contact between platinum and rhodium as intimate as possible. It was found that this is best achieved by first depositing platinum and subsequently rhodium onto the support material by the above described injection precipitation. For that purpose a basic precursor compound of platinum, preferably an amine solubilized platinum like ethanolamine platinum (IV) hexahydroxide, is precipitated by properly adjusting the pH-value of the dispersion with acetic acid to a value between 6 and 8. After precipitation of platinum, the support is not dried and calcined but rhodium is then directly precipitated from a solution of an acidic precursor compound of rhodium, such as rhodium nitrate.

In detail, the second dispersion with platinum and rhodium deposited on active alumina is prepared by dispersing the active alumina in water and then injecting an aqueous solution of an amine solubilized precursor compound of platinum into the coating dispersion. The amine solubilized precursor compound of platinum is readily adsorbed onto the active alumina. Thereafter, an aqueous solution of an acidic precursor compound of rhodium is injected into this dispersion and then the pH-value of the dispersion is properly adjusted to fix the platinum and rhodium compounds onto the second active alumina. This second dispersion is then combined with the first dispersion to yield the final coating composition for the catalyst.

The beneficial properties of the catalyst according to the invention will now be explained further with the help of the following examples. For all catalysts of the following examples honeycomb carriers made from cordierit were used (diameter 10.16 cm; length 15.24 cm; cell density 62 $cm^{-2}$). The concentration or loading of the various washcoat components are given relative to the volume of the carriers in grams per liter (g/l).

EXAMPLE 1

A catalyst according to the invention was prepared by coating a honeycomb carrier with a catalytic coating as described below. The finished coating comprised a platinum to rhodium weight ratio of 5:1 and a total noble metal loading of 1.41 g/l (40 g/ft$^3$). The concentration of the oxidic washcoat components was 160 g/l. This catalyst is designated as C1 in the following.

Preparation of the first dispersion:

To a solution of praseodymium acetate a cerium rich oxygen storage component (70 wt-% ceria, 30 wt-% zirconia, surface area: 200 m$^2$/g) was added. By controlled injection of ammonia and stirring for about 30 minutes, praseodymium acetate was precipitated onto ceria/zirconia. Subsequently stabilized alumina (3 wt-% $La_2O_3$, 97 wt-% $Al_2O_3$, surface area: 140 m²/g) and bulk zirconia (surface area: 100 m²/g) were added. After this, a solution of $(EA)_2Pt(OH)_6$ was injected into the slurry and platinum was precipitated onto ceria/zirconia and zirconia by proper adjustment of the pH-value of the dispersion with acetic acid.

Preparation of the second dispersion:

Stabilized alumina (3 wt-% $La_2O_3$, 97 wt-% $Al_2O_3$) was dispersed in water. Thereafter a chloride free platinum salt $(EA)_2Pt(OH)_6$ was injected and was readily adsorbed onto the alumina. Thereafter rhodium nitrate was injected. By adjusting the pH-value with acetic acid both catalytic components were fixed onto the supporting alumina.

Both dispersions were combined to form a coating composition. The carrier was coated with this composition by dip coating, dried and calcined at 500° C. in air.

The placement of the various components of this catalyst with respect to one another is visualized below. The numbers give the concentration of the coating components in g/l of carrier volume. The precipitation of praseodymium onto ceria/zirconia during the preparation of the first dispersion resulted in a ceria/zirconia stabilized with praseodymium oxide $(CeO_2/ZrO_2/Pr_6O_{11})$ after calcination of the coating.

were added. After this, a platinum solution $(EA)_2Pt(OH)_6$ was injected into the slurry and platinum was precipitated onto alumina, zirconia and ceria/zirconia by proper adjustment of the pH-value of the dispersion with acetic acid.

After milling the slurry, a monolithic carrier was dipped into the slurry to apply the first layer. The complete washcoat uptake after drying and calcining in air at 500° C. was 160 g/l.

Preparation of second (outer) layer:

Stabilized alumina (4 wt-% $La_2O_3$, 96 wt-% $Al_2O_3$) was dispersed in water. Thereafter a chloride free platinum salt $(EA)_2Pt(OH)_6$ was injected and was readily adsorbed onto the alumina. Thereafter rhodium nitrate was injected. By adjusting the pH-value both catalytic components were fixed onto the supporting alumina.

To finish the washcoat, alumina, praseodymium acetate and a ceria rich oxygen storage component (70 wt-% ceria, 30 wt-% zirconia) were introduced.

Before coating a monolithic substrate, the slurry was adjusted to a pH of approximately 6 and milled. The total washcoat uptake of the second layer was 70 g/l. The catalyst was dried and calcined at 500° C. in air.

Placement and concentration values of the various components of this catalyst with respect to one another is visualized below:

```
80 La/Al2O3       ⎫
56 CeO2/ZrO2/Pr6O11 ⎬ + 0.94 Pt          ⎫ composition of 1. layer
24 ZrO2           ⎭                       ⎬
10 La/Al2O3          + 0.235 Pt/0.235 Rh  ⎭
18.5 CeO2/ZrO2                            ⎫
40 Al2O3                                  ⎬ + 1.5 Pr6O11  composition of 2. layer
                                          ⎭
```

The ceria/zirconia concentration of this material was 51.7 g/l while the praseodymia concentration was 4.3 g/l.

```
70 La/Al2O3        ⎫
56 CeO2/ZrO2/Pr6O11 ⎬ + 0.94 Pt          ⎫
24 ZrO2            ⎭                      ⎬ combined in a single layer
10 La/Al2O3           + 0.235 Pt/0.235 Rh ⎭
```

The first three lines give the constituents of the coating resulting from the first coating dispersion and the fourth line gives the constituents resulting from the second dispersion.

COMPARISON EXAMPLE 1

The catalyst C1 according to example 1 was compared to a double layer catalyst according to example 1 of copending European patent application with publication number EP 1 046 423 A2. This catalyst has a similar composition to the catalyst of the present invention. It differs from the catalyst of the present invention in that the support materials catalyzed with platinum only are arranged in a first layer and alumina catalyzed with platinum and rhodium is arranged together with further components in a second outer layer.

Preparation of first (inner) layer:

To a solution of praseodymium acetate a cerium rich oxygen storage component (70 wt-% ceria, 30 wt-% zirconia) was added. By controlled injection of ammonia and stirring for about 30 min praseodymium acetate was precipitated onto ceria/zirconia. Subsequently stabilized alumina (3 wt-% $La_2O_3$, 97 wt-% $Al_2O_3$) and bulk zirconia In the first layer the ceria/zirconia stabilized with praseodymia had the same weight ratio of ceria/zirconia to praseodymia as given in example 1 (51.7/4.3). In the second layer praseodymium acetate was impregnated onto all components of this layer.

The mass ratio of platinum to rhodium was 1Pt/1Rh in the top layer. The total platinum and rhodium content was 1.41 g/l (1.175 g Pt/l and 0.235 g Rh/l) at a mass ratio of 5Pt/1Rh (combined mass ratio for both layers). This comparison catalyst will be designated as CC1 in the following.

Evaluation of catalysts:

The light off temperatures of the catalysts according to the invention and the comparison catalyst (both will be called "sample catalysts" in the following) were tested at a vehicle with a V8 internal combustion engine (8 cylinder engine; displacement 5.3 l). The exhaust gas system of this engine was equipped with two exhaust gas converters in sequence. The first converter was closely coupled to the engine while the second converter was arranged underfloor.

The close coupled converter was equipped with a palladium only catalyst which had a volume of 0.431 l at a diameter of 9.3 cm (3.66 inch) and at a length of 6.35 cm (2.5 inch). The sample catalysts had a volume of 0.776 l at the same diameter as the close coupled catalyst but at a length of 11.43 cm (4.5 inch). The two sample catalysts were each placed into an individual underfloor converter.

Before measuring the light off temperatures, the underfloor converters with the sample catalysts were first subjected for 65 hours to an ageing procedure at a motor test stand certified by the U.S. EPA (Environmental Protection Agency). The maximum converter inlet temperature was 850° C. This ageing procedure is acknowledged to be equivalent to a normal driving cycle of 80000 km.

After the ageing procedure, the two underfloor converters were installed one at a time to the test vehicle. Then the engine was run according to the FTP 75 test cycle. The emissions collected in all three bags are listed in table 3. The emissions of carbon monoxide are not listed because they remained far below all current and future emission limits.

TABLE 3

Result of FTP 75 test cycle; composite bag data for non-methane hydrocarbons (NMHC) and nitrogen oxides (NO$_x$)

| catalyst | NMHC [g/mile] | (NO$_x$) [g/mile] |
|---|---|---|
| C1 | 0.08 | 0.140 |
| CE1 | 0.10 | 0.135 |

EXAMPLE 2

A further catalyst according to example 1 was prepared. Differently from example 1 the catalyst was prepared with an integral platinum to rhodium weight ratio of 2:1 while the platinum to rhodium weight ratio on the second alumina was kept at 1:1. The completed honeycomb catalyst after drying and calcining had a coating concentration of 160 g/l oxidic components and 1.06 g/l (30 g/ft$^3$) platinum plus rhodium. This catalyst is designated as C2 in the following.

Placement and concentration (g/l of carrier volume) of the various components of catalyst C2 with respect to one another is visualized below:

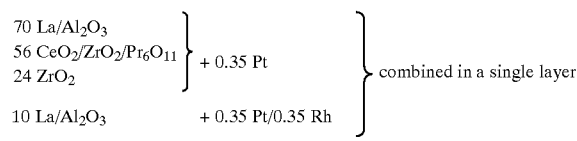

COMPARISON EXAMPLE 2

The catalyst of the invention uses active alumina stabilized with lanthana, particulate zirconia and particulate ceria/zirconia as support materials for the noble metals of the catalyst.

State of the art catalyst designs are frequently based on unstabilized active alumina and particulate ceria. Additionally cerium acetate and zirconium acetate are added to the coating dispersion and converted into ceria and zirconia homogeneously dispersed throughout the catalyst upon calcining the catalytic coating. The coating is then catalyzed by impregnation with platinum and rhodium compounds.

In order to compare this older technology with the catalyst according to the invention comparison catalyst CC2 was manufactured as follows: The active alumina (surface area 140 m$^2$/g) and particulate ceria (low surface area material with 10 m$^2$/g) were dispersed in water. After addition of cerium acetate and zirconium acetate the resulting coating dispersion was used to coat a honeycomb carrier. The thus prepared support layer was dried and calcined and then simultaneously impregnated with platinum and rhodium using a common solution of platinum tetraammine nitrate and rhodium nitrate. The impregnated coating was again dried and calcined.

Placement and concentration of the various components of catalyst CC2 with respect to one another is visualized below:

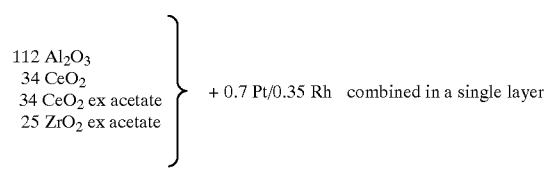

COMPARISON EXAMPLE 3

A further comparison catalyst designated as CC3 was manufactured as follows: All oxidic components of the catalyst of example 2 were first catalyzed with platinum as described in example 2 and then dispersed in water and coated onto a honeycomb carrier. The coating was dried and calcined. The resulting catalytic layer was then further impregnated with rhodium nitrate and dried and calcined. This comparison catalyst had the same overall concentration of the constituents as catalyst C2. The only difference resided in the placement of platinum and rhodium with respect to the support materials and with respect to one another.

Placement and concentration of the various components of catalyst CC3 with respect to one another is visualized below:

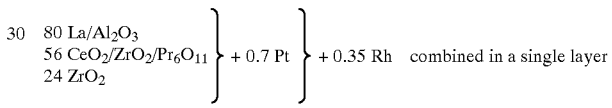

COMPARISON EXAMPLE 4

A further comparison catalyst designated as CC4 was manufactured using the processes as already outlined in example 1 and 2. Comparison catalyst CC4 had the same overall concentration of the constituents as catalyst C2. Differently from example 2 platinum and rhodium were placed on different support materials as visualized below:

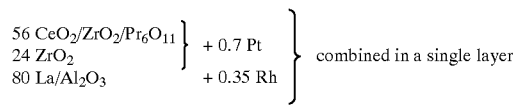

Evaluation of catalysts C2, CC2, CC3 and CC4:

Fuel-cut ageing procedure:

The four catalysts were first subjected to a so-called fuel-cut ageing on an engine with a displacement of 2.8 l for a duration of 76 hours. The exhaust system of this engine was equipped with a special adapter which allowed to age all four catalysts in parallel.

Figure 3:
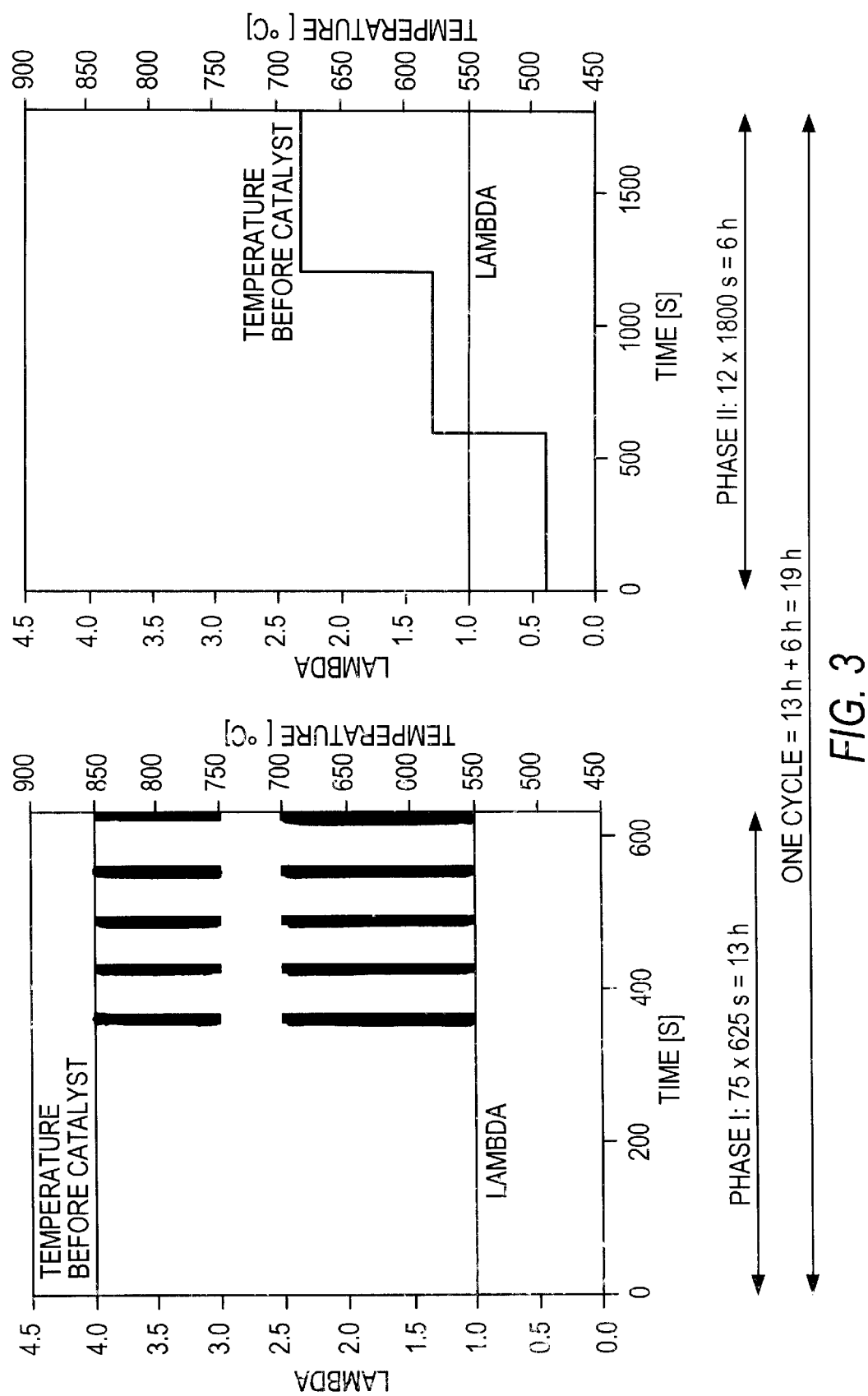
FIG. 3 is a schematic diagram of the fuel cut-ageing employed in this invention

The fuel cut ageing comprised four cycles of 19 hours length. Each cycle consisted of two phases as shown in FIG. 3. During phase I the catalysts were subjected to 75 sub-cycles simulating fuel-cut conditions. During each sub-cycle the exhaust gas temperature in front of the catalyst was adjusted to a value of 850° C. by increasing the load of the engine accordingly. The engine was operated at a lambda value of 1 (stoichiometric operation). After an initial phase of 360 seconds of stoichiometric operation fuel supply was interrupted every 60 seconds for 5 seconds so that the lambda value jumped from 1 to 2.5. Fuel cut resulted in an exposure of the catalyst to highly oxidizing, lean exhaust gas conditions at high exhaust gas temperatures. During stoichiometric operation the temperature at the catalyst increased by 80 to 100° C. due to the exothermal reactions at the catalyst. Each of the 75 sub-cycles lasted for 625 seconds.

Phase II consisted of 12 sub-cycles simulating poisoning of the catalysts with sulphur compounds at moderate exhaust gas temperatures. During each sub-cycle the exhaust gas temperature was increased in three steps from 490° C. to 580° C. and then to 680° C. Each step lasted for 10 minutes.

After fuel-cut ageing, the light off temperatures $T_{50\%}$ for the conversion of HC, CO and $NO_x$, and the $CO/NO_x$ dynamic cross-over points were determined at an engine with a displacement of 2 liters. The term "light off temperature" designates the exhaust gas temperature at which 50% of the respective pollutant is converted by the catalyst. The term "dynamic cross-over point" and its measurement is described in detail in the co-pending European patent application EP 1 046 423 A2 of the present inventors.

The light-off measurements were done at a space velocity of 65000 $h^{-1}$ with gradually increasing the exhaust gas temperature (38 K/min) of the engine. During these measurements the lambda-value was modulated with an amplitude of ±0.5 A/F (A/F=air to fuel ratio) and a frequency of 1 Hz. The mean lambda-value was regulated to a value of 0.999.

The conversion value at the cross-over point is the highest conversion which can be achieved simultaneously for CO and $NO_x$. The higher this cross-over point the better is the dynamic behaviour of the catalytic activity of the catalyst. The cross-over points were determined at an exhaust gas temperature of 400° C.

The results of these measurements are listed in Table 4. Each value is the mean value of several measurements. The cross-over points depend slightly on the direction of changing the lambda value. The values given in Table 4 are the mean values obtained from changing the lambda value from rich to lean and from lean to reach. In addition these measurements were averaged over several lean to reach and reach to lean cycles.

TABLE 4

| | | | | $CO/(NO_x)$ [%] | |
|---|---|---|---|---|---|
| | | $T_{50\%}$ [° C.] | | 400° C. 1 Hz | 400° C. 1 Hz |
| Catalyst | HC | CO | $(NO_x)$ | ±0.5 A/F | ±1.0 A/F |
| C2 | 346 | 346 | 341 | 95 | 94 |
| CC2 | 348 | 349 | 338 | 86 | 85 |
| CC3 | 351 | 354 | 344 | 89 | 88 |
| CC4 | 345 | 348 | 342 | 93 | 92 |

The results of Table 4 demonstrate that the inventive catalyst C2 has a considerably improved dynamic behaviour of its catalytic activity though its light off temperatures $T_{50\%}$ do not differ so much from the light off temperatures of the comparison catalysts. The difference between the cross-over conversion of the inventive catalyst and the comparison catalysts would have been even more pronounced at higher exhaust gas temperatures during ageing (e.g. 950° C. instead of 850° C. in front of the catalysts).

EXAMPLE 3

A further catalyst C3 was prepared identically to catalyst C2.

COMPARISON EXAMPLE 5

Frequently barium oxide is added to the coating dispersion in the form of barium hydroxide to improve temperature stability of the alumina component of the catalytic composition and to improve $NO_x$ conversion of the catalyst. To investigate the influence of barium oxide on the catalytic activity under the conditions of fuel-cut ageing comparison catalyst CC5 was prepared. CC5 was a variant of catalyst C3. The 70 g/l of $La/Al_2O_3$ of the first coating dispersion were reduced to 60 g/l and 10 g/l of barium oxide were added in the form of barium hydroxide instead.

COMPARISON EXAMPLE 6

Comparison catalyst CC6 was prepared in analogy to example 1 of U.S. Pat. No. 5,200,384. For the coating dispersion active alumina with a surface area of 140 $m^2/g$, ceria with a surface area of 80 $m^2/g$, zirconium carbonate and zirconia/ceria mixed oxide (weight ratio 80/20) were used. The weight ratio of platinum to rhodium was set to 2:1 and the total concentration of the oxidic washcoat components in the finished catalyst was increased to 160 g/l. Preparation of the catalyst followed as closely as possible the procedure as outlined in example 1 of U.S. Pat. No. 5,200,384. As disclosed there, all platinum and rhodium were deposited onto active alumina. For that purpose (EA)$_2$Pt(OH)$_6$ and rhodium nitrate were used.

The finished catalyst had the following composition: 1.06 g/l (30 g/ft$^3$) platinum plus rhodium; weight ratio of platinum to rhodium 2:1; 102.4 g/l alumina; 38.4 g/l ceria; 6.4 g/l zirconia (ex zirconium carbonate) and 12.8 g/l zirconia/ceria. The concentration of all oxidic components of the catalyst was 160 g/l.

COMPARISON EXAMPLE 7

Comparison catalyst CC7 was prepared in analogy to example 1 of U.S. Pat. No. 4,965,243. For the coating dispersion active alumina with a surface area of 140 $m^2/g$, ceria with a surface area of 80 $m^2/g$, zirconia with a surface area of 100 $m^2/g$ and barium hydroxide were used. The weight ratio of platinum to rhodium was set to 2:1 and the total concentration of the oxidic washcoat components in the finished catalyst was increased to 160 g/l. Preparation of the catalyst followed as closely as possible the procedure as outlined in example 1 of U.S. Pat. No. 4,965,243. As disclosed there, all platinum and rhodium were deposited onto active alumina. For that purpose (EA)$_2$Pt(OH)$_6$ and rhodium nitrate were used.

The finished catalyst had the following composition: 1.06 g/l (30 g/ft$^3$) platinum plus rhodium; weight ratio of platinum to rhodium 2:1; 85.2 g/l alumina; 48.7 g/l ceria; 17 g/l zirconia and 9.1 g/l baria (ex barium hydroxide).

Evaluation of catalyst C3, CC5, CC6 and CC7:

The four catalysts were aged as before and then subjected to the same test procedures as outlined for the results of Table 4. The cross-over conversion values were determined at 400° C. at a lambda modulation of 1 Hz±0.5 A/F and at 450° C. at a lambda modulation of 1 Hz±1.0 A/F. The results are listed in Table 5.

TABLE 5

| Catalyst | $T_{50\%}$ [°C.] | | | CO/(NO$_x$) [%] | |
| --- | --- | --- | --- | --- | --- |
| | HC | CO | (NO$_x$) | 400° C. 1 Hz ± 0.5 A/F | 450° C. 1 Hz ± 1.0 A/F |
| C3 | 349 | 348 | 344 | 93 | 91 |
| CC5 | 392 | 376 | 375 | 64 | 64 |
| CC6 | 378 | 367 | 364 | 57 | 47 |
| CC7 | >450 | 396 | 398 | 49.5 | — |

For comparison catalyst CC7 no cross-over point at 450° C. could be detected.

The cross-over conversions of comparison catalyst CC5 are considerably lower than the corresponding values of catalyst C3. This is attributed to the detrimental influence of barium oxide on platinum under the conditions of fuel-cut ageing. Fuel-cut ageing leads to the formation of platinum platinate and hence to a decrease in catalytic activity. This also holds for comparison catalyst CC7 for which no cross-over point could be detected at 450° C. after fuel-cut ageing.

Further variations and modifications of the foregoing will be apparent to those skilled in the art and are intended to be encompassed by the claims appended hereto.

German priority application 00 106 611.7 is relied on and incorporated herein by reference.

We claim:

1. A single layer high performance catalyst containing on an inert carrier body a catalytic coating including platinum, and rhodium, said catalyst coating comprising
    a) at least one first support material selected from the group consisting of a first active alumina, a ceria rich ceria/zirconia mixed oxide, a zirconia component and mixtures thereof, said at least one first support material being catalyzed with a first part of the total platinum amount of the catalyst, and
    b) a second support material catalyzed with the second part of the total platinum amount and with rhodium, said second support material being a second active alumina stabilized with rare earth oxides.

2. The catalyst according to claim 1, wherein the global platinum/rhodium mass ratio in the catalyst is in the range of from 10:1 to 1:5.

3. The catalyst according to claim 1, wherein platinum and rhodium are present on said second active alumina with a platinum/rhodium mass ratio of from 3:1 to 1:5.

4. The catalyst according to claim 1, wherein platinum and rhodium are present in said catalytic coating in concentrations of from 0.05 to 10 wt.-% relative to the total weight of said coating.

5. The catalyst according to claim 1, wherein platinum and rhodium are present on said second active alumina in intimate contact with each other.

6. The catalyst according to claim 1, wherein said first support material is active alumina and said first and second active alumina are stabilized with 0.5 to 2.5 wt.-% of lanthana, ceria, yttria, neodymia, gadolinium oxide or mixtures thereof.

7. The catalyst according to claim 1, wherein said first support material comprises at least a ceria/zirconia mixed oxide and said ceria/zirconia mixed oxide contains from 60 to 90 wt.-% of ceria relative to the total weight of the mixed oxide and is stabilized with praseodymia, yttria, neodymia, lanthana, gadolinium oxide or mixtures thereof.

8. The catalyst according to claim 1, wherein said first support material comprises at least a zirconia component and said zirconia component comprises from 0.5 to 55 wt.-% of ceria, yttria, neodymia, lanthana, praseodymia, gadolinium oxide or mixtures thereof, whereby zirconia is present in an amount which is equal to or larger than the amount of ceria.

9. The catalyst according to claim 8, wherein said zirconia component is zirconia or zirconia stabilized with 0.5 to 10 wt.-% of yttria, ceria, neodymia, lanthana, praseodymia, gadolinium oxide or mixtures thereof.

10. The catalyst according to one of the claim 9, wherein said carrier body is in the form of a honeycomb with a plurality of substantially parallel passage ways extending therethrough, the passage ways being defined by walls onto which the catalytic coating is applied in amounts of from about 50 to 250 g/l of carrier volume.

11. The catalyst according to claim 10, wherein said first active alumina is present in amounts of from 0 to 150 g/l, said ceria/zirconia mixed oxide is present in amounts of from 10 to 100 g/l and said zirconia component is present in amounts of from 0 to 80 g/l.

12. The catalyst according to claim 11, wherein said second active alumina is present in amounts of from 5 to 50 g/l.

13. The catalyst according to claim 12, wherein said catalytic coating further comprises from about 1 to 30 g/l of a nickel, iron or manganese component.

14. A method for manufacturing the catalyst according to claim 1, comprising
    a) preparing an aqueous dispersion from said at least one first support material, injecting a solution of a basic precursor compound of platinum into this dispersion and adjusting the pH-value of the resulting dispersion with acetic acid to below 7,
    b) preparing an aqueous dispersion from the second active alumina, injecting a solution of a basic precursor compound of platinum into this dispersion,
    c) thereafter injecting an aqueous solution of an acidic precursor compound of rhodium into the coating dispersion from step b) and adjusting the pH-value of the dispersion with acetic acid to a value between 6 and 8 to thereby obtain a platinum/rhodium catalyzed second active alumina,
    d) combining the dispersion from step a) and step c) to obtain a coating composition,
    e) using said coating composition to apply said catalytic coating onto said monolithic carrier body, and
    f) drying and calcining the coated monolithic carrier.

15. A method according to claim 14, comprising said basic precursor compound of platinum is (EA)$_2$Pt(OH)$_6$ and said acidic precursor compound of rhodium is rhodium nitrate.

16. A method for manufacturing the catalyst according claim 1 comprising
    a) impregnating said at least one first support material with an aqueous solution of a soluble precursor compound of platinum, drying and calcining the impregnated materials to thermally fix platinum thereon,
    b) preparing an aqueous dispersion from the platinum catalyzed materials of step a),
    c) preparing an aqueous dispersion from the second active alumina, injecting a solution of a basic precursor compound of platinum into this dispersion,
    d) thereafter injecting an aqueous solution of an acidic precursor compound of rhodium into the coating dispersion from step c) and adjusting the pH-value of the dispersion with acetic acid to a value between 6 and 8 to thereby obtain a platinum/rhodium catalyzed second active alumina, e) combining the dispersion from step b) and step d) to obtain a coating composition, f) using said coating composition to apply said catalytic coating onto said monolithic carrier body, and g) drying and calcining the coated monolithic carrier.

17. A method according to claim 16, wherein said precursor compound of platinum is $(EA)_2Pt(OH)_6$ and said acidic precursor compound of rhodium is rhodium nitrate.

18. The single layer high performance catalyst prepared according to the method of claim 14.

19. The single layer high performance catalyst prepared according to the method of claim 16.

20. The catalyst according to claim 6, wherein said second active alumina is stabilized with 3 to 25 wt.-% of lanthana, ceria, yttria, neodymia, gadolinium oxide or mixtures thereof.

* * * * *